UNITED STATES PATENT OFFICE.

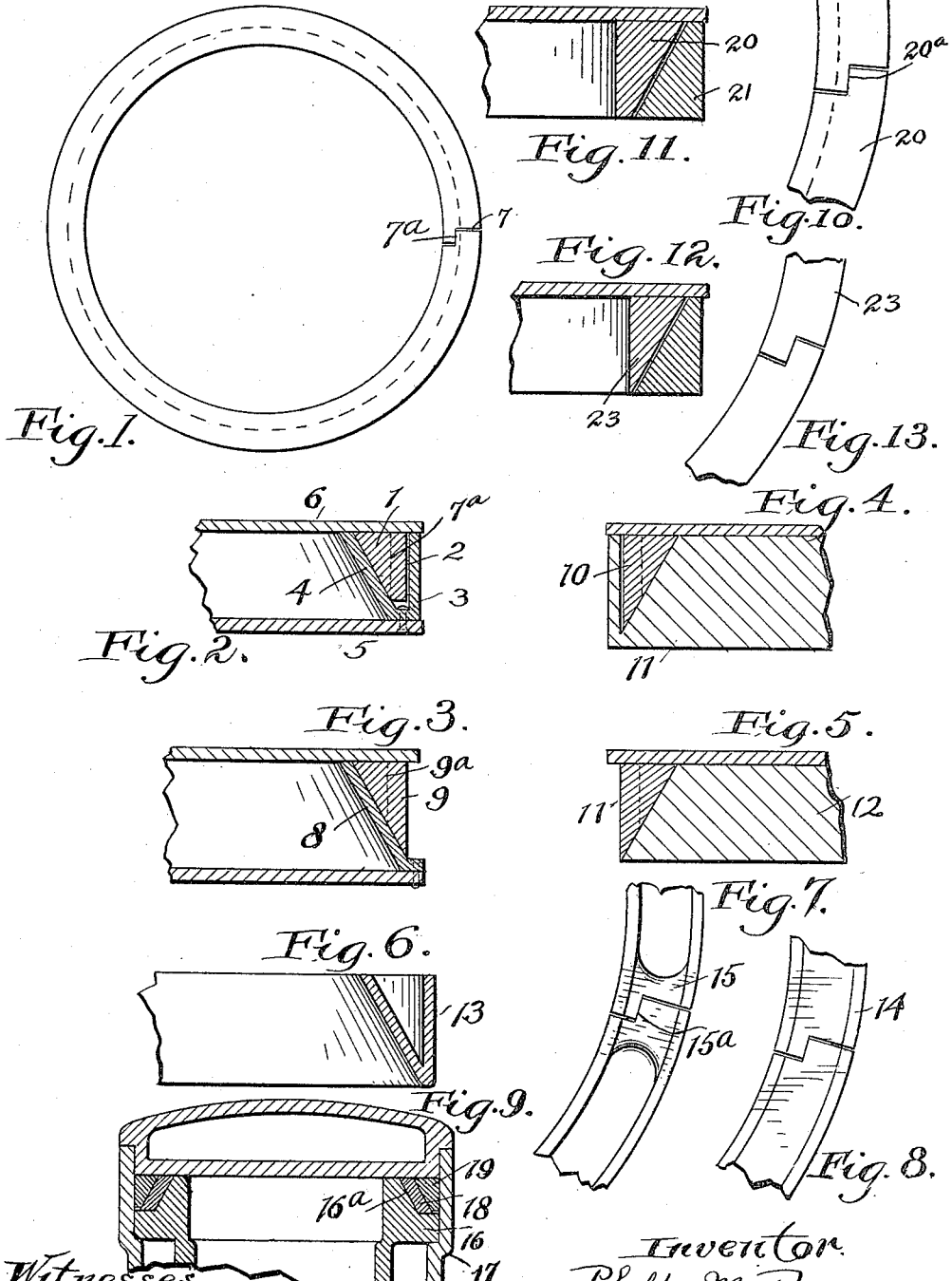

PHELPS M. FREER, OF DETROIT, MICHIGAN.

PACKING-RING.

1,311,159.   Specification of Letters Patent.   Patented July 29, 1919.

Application filed February 16, 1914. Serial No. 818,834.

*To all whom it may concern:*

Be it known that I, PHELPS M. FREER, a citizen of the United States, residing at Detroit, in the county of Wayne and State of Michigan, have invented a certain new and useful Improvement in Packing-Rings, of which the following is a full, clear, and exact description.

This invention relates to packing rings and the object is to produce a novel form of packing ring which by its resiliency will act to confine gases or liquids and prevent their passage beyond the ring, and further, in providing a construction whereby gases or liquids will be unable to force their way beyond the joints in the ring.

Generally speaking, the invention comprises the elements and combinations thereof set forth in the accompanying claims.

Reference should be had to the accompanying drawings forming a part of this specification, in which Figure 1 is a top plan view of one form of a packing ring; Figs. 2, 3, 4 and 5 show various mountings in which the packing ring may be used; Fig. 6 is an elevation partly in section of a packing ring made of sheet metal; Fig. 7 is a top plan view of a portion of a sheet metal packing ring; Fig. 8 is a top plan view of another form of sheet metal ring; Fig. 9 is a sectional elevation showing a modified form of packing ring; Fig. 10 is a partial top plan view of such ring; Fig. 11 is a sectional elevation and mounting of a form of my ring; Fig. 12 is a sectional elevation and mounting of a form of my ring; and Fig. 13 is a partial top plan view of such ring.

The packing rings forming the subject matter of this invention are made of a material which possesses inherent resiliency, and having one surface which is slanting. Such a packing ring is used in connection with a mounting having a slanting surface which coöperates with the slanting surface upon the ring, and the mechanical coöperation between the ring and its mounting is such that the resiliency of the ring normally causes the packing ring to ride up upon the slanting surface of the mounting, thereby holding the ring tightly and firmly against some coöperating surface, thereby preventing the escape of fluid beyond the ring.

As shown in Figs. 2 to 5 inclusive, there is a solid ring 1 which upon one side is provided with a slanting surface 2. The ring may be blunt at its lower edge, as shown in Fig. 2, or it may be pointed or brought to an edge as indicated in Figs. 3 to 5 inclusive.

In Fig. 2 the mounting for the ring is shown as a sheet metal cage represented at 3,— this cage being provided with a slanting surface 4 which coöperates with the slanting surface 2 of the ring, the cage 3 being secured to a part 5. There is also a member 6 against which the packing ring bears, the purpose of such a construction being to prevent the passage of fluid along the member 6 beyond the packing ring.

As before stated, the ring 1 may be made of some material which possesses some inherent resiliency, as for instance cast iron, and the ring 1 as it bears upon the slanting surface of the circular cage 3, will tend to ride up the surface 4 and firmly press against the member 6.

Preferably, a ring such as shown in Fig. 2 would be split, as indicated in Fig. 1. That is to say,—along a line of jointure represented at 7. This provides the coöperating ends of the ring each with a tongue extension which extensions are in contact and permit relative sliding of the extensions upon each other. The resiliency of the ring is such as to normally draw the ends of the ring toward each other, and when associated with such a mounting or cage as indicated at 3, in Fig. 2, the ends of the ring are slightly spread as the ring is pushed down upon the slanting surface 4, so that the tendency of the ring is to ride up the slanting surface of the mounting or cage 4 and to firmly press against member 6.

The lengths of the tongues upon the ring should be such that they will always overlap, so that there is no break in the continuity of the ring.

Such a jointure as shown in Fig. 1 will permit an expansion of the ring 1 without producing any break in the continuity of the ring.

The line of jointure, as indicated at 7, is along planes which are substantially perpendicular with respect to the axis of the ring, and the plane of the jointure, which is represented at 7ª, is so placed as to lie within the inner lower edge of the bottom portion of the ring,—that is, it intersects the plane of the slanting surface of the ring. This plane of jointure is indicated at 7ª in Fig. 2, wherein it is shown as occurring at substantially the inner edge of the lower flat portion of the ring.

With this construction, it will be seen that even though the ring be expanded, the vertical grooves formed by such expansion upon the outside and the inside of the ring, will not be in direct communication, but there will be a wall at the lower edge of the ring which will prevent communication between these two grooves, which have just been mentioned. Therefore, if fluid finds its way along the groove of jointure between the ends of the ring which are adjacent the surface 4 of the cage shown in Fig. 2, the wall formed at the bottom of this groove will prevent fluid from passing beyond the groove and up around the groove in the outside of the ring, which would be adjacent the vertical wall of the cage 3. The thickness of this wall at the bottom portion of the ring may be varied by moving the plane 7ª farther away from the inner lower edge of the ring.

In Fig. 3 I have shown the retaining mounting for the ring as comprising an annular cage 8, which has one side which is slanting, but no outside retaining wall. In other words, this cage is similar to the cage shown in Fig. 2, except that the outer vertical wall is omitted.

Further, the packing ring 9 is slightly different from the packing ring shown in Fig. 2, in that the lower portion comes to an edge instead of having a flat surface as is the case with the packing ring 1. In this ring, it will be noted that the plane of cleavage which extends longitudinally of the ring, as indicated at 9ª in this figure, lies within the lower edge, thereby accomplishing the same results as that indicated with respect to the ring 1.

Whether a ring, such as 1 or 2 be employed, is merely a matter of the amount of stock which it may be considered desirable or necessary to employ in a ring in order that the ring may be of the desired strength.

In Fig. 4, the ring indicated at 10 is the same as the ring indicated at 9 in Fig. 3, and in this instance I have shown the mounting 11 for the ring as a solid piece of material, having a groove formed therein of proper shape to receive the ring 10.

In Fig. 5, the ring 11 is the same as that illustrated in Figs. 3 and 4, and the mounting 12 is a solid piece of material having no outer retaining wall or strip, such as indicated in Fig. 4. In other words, the mounting for the ring, as indicated at 3 in Fig. 2, and 11 in Fig. 4, is substantially the same, except that in Fig. 2, the mounting is formed of sheet metal pressed into shape, while in Fig. 4 the mounting is of a solid piece of material having a groove formed therein.

In Fig. 6, I have shown a portion of a ring 13 which may be formed of sheet metal. The lower edge of this ring may be brought to more or less of an edge, the same as the rings 1, 9, 10 and 11, indicated above.

The ring may be entirely filled with a suitable bearing metal, as indicated at 14, in Fig. 8, or if desired, only that portion of the ring may be filled with metal through which the jointure planes are to be cut, as indicated at 15 in Fig. 7. The planes of jointure are arranged with respect to the ring exactly the same as that indicated and described with respect to the preceding figures. That is to say, the plane of jointure 15ª will pass within the lower edge of the ring. So far as the mounting for the ring is concerned, it may be any one of the forms of mounting which have been shown and described in connection with Figs. 2 to 5.

In Fig. 9 a member 16 is adapted to move relatively to a member 17, and the outer portion of the member 16 is provided with a groove, the inner surface of which is slanting, as indicated at 16ª. Coöperating with this grove are two packing rings 18 and 19. The ring 18 is in cross section rhombic in form, and is preferably made of a resilient material, such as cast iron, and when placed in the groove of the member 16, will by its resiliency tend to ride up along the slanting surface 16ª. This ring is split at some place upon its length preferably, although not necessarily, in such a manner as indicated in Fig. 1.

Coöperating with the ring 18 is a ring 19, which as shown, is of the general shape of the rings 9, 10 and 11. This ring is built along planes of jointure, which may be similar to those illustrated in Fig. 1, and preferably the split portion of rings 18 and 19 are arranged so that they will not be coincident.

The inner slanting surface of the ring 19 coöperates with the outer slanting surface of the ring 18, and due to the resiliency of the ring 19, this ring tends to slide or ride up on the outer inclined surface of the ring 18. This construction, as illustrated, provides a double packing ring, and will effectually prevent the passage of fluid beyond the ring.

In Figs. 10 and 11, I have shown a packing ring 20 which is similar to the rings shown in Figs. 1 and 2, with the exception that the ring 20 might be termed an expansion ring,—that is to say, normally the ends of the ring 20 tend to separate, due to the resiliency of the ring. The ring when associated with a mounting 21 having an inner slanting surface, will be compressed when it is placed in contact with the member 21, and the expansive force due to the resiliency of the ring, will tend to cause the ring to slide upwardly upon the slanting surface of the member 21, and press against the member 22. The ring 20 is split, as indicated at 20ª, in relatively the same manner as shown in Figs. 1 and 2. That is to say, the plane upon which the projections due to the splitting of the ring will slide, intersects the slanting surface upon the ring.

In Figs. 12 and 13, the ring 23 is formed so that the lower portion comes to an edge, but in other respects is similar to the ring shown in Figs. 10 and 11. This ring is split in the same manner as is the ring 20, as will be clearly seen from Fig. 13.

Various modifications in the details of the packing rings as shown and described, as well as in the mountings for these rings may be employed, without departing from the spirit of the invention, as disclosed herein.

Having thus described my invention, what I claim is:

1. The combination with a retaining member, of a coöperating member, said members being relatively movable, said retaining member being formed with a slanting surface, a packing ring formed of resilient material and having a slanting surface which coöperates with the slanting surface of the retaining member, said ring being split and provided with extensions which slidably engage each other, said extensions engaging along a plane which is at substantially right angles to a diameter of the ring, the plane of the surface along which the said projections engage intersecting the plane of the slanting surface, substantially as described.

2. A packing ring comprising an annular body, said body having a slanting surface upon one side thereof, the said body being split providing two extending projections which slidably engage each other, said extensions engaging along a plane which is at substantially right angles to a diameter of the ring, the plane of the surfaces upon which the projections slidably engage intersecting the surface of the aforesaid slanting portion.

3. A packing ring comprising a body having an inclined or slanting annular surface, said ring being split transversely in two planes which are parallel with each other, and split longitudinally by a plane substantially at right angles to the first mentioned planes, the plane of the longitudinal split intersecting the plane of the inclined or slanting annular surface, and the said plane of the longitudinal split being substantially perpendicular to a diameter of the ring.

4. The combination with a retaining member, of a coöperating member, said members being relatively movable, said retaining member being formed with a slanting surface, a split packing ring rhombic in cross sectional form engaging said slanting surface of the retaining member, a second packing ring substantially triangular in cross section engaging with the first mentioned packing ring, said ring being formed of resilient material whereby the packing engaging the retaining member tends to ride upon the slanting surface thereof, and the other packing ring tends to ride upon the surface of the packing ring engaging the retaining member.

In testimony whereof, I hereunto affix my signature in the presence of two witnesses.

PHELPS M. FREER.

Witnesses:
EDWARD C. MORAN,
JULIAN DICKINSON.

Copies of this patent may be obtained for five cents each, by addressing the "Commissioner of Patents, Washington, D. C."